US012531947B2

(12) United States Patent
Smith-Rose et al.

(10) Patent No.: US 12,531,947 B2
(45) Date of Patent: Jan. 20, 2026

(54) COMPUTER-BASED SYSTEMS CONFIGURED TO DYNAMICALLY VERIFY A PLURALITY OF INTERACTION SESSIONS ASSOCIATED WITH AN INTERACTION SESSION DATA SOURCE AND METHODS OF USE THEREOF

(71) Applicant: Capital One Services, LLC, McLean, VA (US)

(72) Inventors: Asher Smith-Rose, Midlothian, VA (US); Tyler Maiman, Melville, NY (US); Joshua Edwards, Philadelphia, PA (US); Shabnam Kousha, Washington, DC (US)

(73) Assignee: Capital One Services, LLC, McLean, VA (US)

( * ) Notice: Subject to any disclaimer, the term of this patent is extended or adjusted under 35 U.S.C. 154(b) by 168 days.

(21) Appl. No.: 18/438,065

(22) Filed: Feb. 9, 2024

(65) Prior Publication Data
US 2025/0260768 A1    Aug. 14, 2025

(51) Int. Cl.
| | | |
|---|---|---|
| *H04M 3/00* | (2024.01) | |
| *H04L 65/1076* | (2022.01) | |
| *H04L 65/1096* | (2022.01) | |
| *H04M 1/56* | (2006.01) | |
| *H04M 3/22* | (2006.01) | |
| *H04M 3/42* | (2006.01) | |
| *H04M 3/436* | (2006.01) | |

(52) U.S. Cl.
CPC ........ *H04M 3/436* (2013.01); *H04L 65/1076* (2013.01); *H04L 65/1096* (2013.01); *H04M 3/2281* (2013.01); *H04M 3/42221* (2013.01); *H04M 2201/40* (2013.01); *H04M 2201/42* (2013.01)

(58) Field of Classification Search
CPC ............... H04M 3/436; H04M 3/2281; H04M 3/42221; H04M 2201/40; H04M 2201/42; H04L 65/1076; H04L 65/1096
USPC ............... 379/201.01–201.4, 265.01–265.14, 379/266.01–266.1, 309
See application file for complete search history.

(56) References Cited

U.S. PATENT DOCUMENTS

| | | | | |
|---|---|---|---|---|
| 9,152,775 | B1 * | 10/2015 | Kronrod ................. | G06F 21/31 |
| 10,169,806 | B1 * | 1/2019 | Golwalkar ......... | G06Q 30/0633 |
| 2001/0023402 | A1 * | 9/2001 | Flynn ..................... | G06Q 30/06 |
| | | | | 705/304 |

(Continued)

*Primary Examiner* — William J Deane, Jr.
(74) *Attorney, Agent, or Firm* — Greenberg Traurig, LLP

(57) ABSTRACT

In some embodiments, the present disclosure provides an exemplary method that may include steps of obtaining a permission from a user to monitor a plurality of activities; receiving monitoring data of the plurality of activities for a first period of time; verifying at least one common session parameter to identify an incoming interaction sessions; utilizing a software application to access an interaction session database; identifying an interruption associated with the software application for a second period of time; utilizing a machine learning algorithm to verify the interruption; determining a plurality of authentication rules; adjusting the plurality of authentication rules, receiving a response to an interactive communication; and updating the database of known session interaction parameters.

20 Claims, 7 Drawing Sheets

(56) References Cited

U.S. PATENT DOCUMENTS

| | | | |
|---|---|---|---|
| 2003/0174823 A1* | 9/2003 | Justice | G06Q 20/4016 |
| | | | 379/145 |
| 2004/0203017 A1* | 10/2004 | Dropulic | C12N 15/1034 |
| | | | 435/6.13 |
| 2018/0176372 A1* | 6/2018 | Algard | H04M 3/42102 |
| 2020/0065459 A1* | 2/2020 | Himabindu | G06F 21/316 |
| 2021/0201327 A1* | 7/2021 | Konig | G06Q 30/02 |
| 2024/0121338 A1* | 4/2024 | Charlson | H04M 3/42042 |

* cited by examiner

COMPUTER-BASED SYSTEMS CONFIGURED TO DYNAMICALLY VERIFY A PLURALITY OF INTERACTION SESSIONS ASSOCIATED WITH AN INTERACTION SESSION DATA SOURCE AND METHODS OF USE THEREOF

FIELD OF TECHNOLOGY

The present disclosure generally relates to computer-based systems configured to dynamically verify a plurality of interaction sessions associated with an interaction session data source and methods of use thereof.

BACKGROUND OF TECHNOLOGY

Typically, spam is directed to large numbers of users for the purposes of advertising, phishing, or spreading malware. Usually, spam includes all forms of unwanted communications including, but not limited to unsolicited calls or messages, caller identification spoofing, and robocalls. The goal or purpose of a spam call is to sell some goods that might be unsolicited or unwanted.

SUMMARY OF DESCRIBED SUBJECT MATTER

In some embodiments, the present disclosure provides an exemplary technically improved computer-based method that includes at least the following steps: obtaining, by at least one processor, via each respective instance of at least one graphical user interface (GUI) having at least one programmable GUI element, a permission from each user in a plurality of users to monitor a plurality of activities executed within of a plurality of computing devices associated with the plurality of users; continually receiving, by the at least one processor, in response to obtaining the permission from the plurality of users, monitoring data of the plurality of activities executed within the plurality of computing devices for a predetermined period of time; automatically verifying, by the at least one processor, at least one common session parameter associated with the interaction session database to identify a plurality of incoming interaction sessions when, based on a database of known session interaction parameters, the at least one common session parameter is associated with at least one of a particular entity, a particular individual, or a particular physical location; utilizing, by the at least one processor, a particular software application to access an interaction session database; identifying, by the at least one processor, at least one interruption associated with the software application for a different predetermined period of time; utilizing, by the at least one processor, a trained anomaly verification machine learning algorithm to verify the detected anomaly based on the at least one common session parameter of the plurality of incoming interaction sessions; determining, by the at least one processor, a plurality of authentication rules associated with the at least one detected anomaly and the at least one computing device of the plurality of the computing devices associated with the plurality of users based on a pre-generated database of authentication rules; automatically adjusting, by the at least one processor, the plurality of authentication rules associated with the at least one detected anomaly based on a determination that the at least one detected anomaly occurred during the different predetermined period of time; receiving, by the at least one processor, from the particular computing device, a response to an interactive communication associated with an adjustment to the plurality of authentication rules associated with the at least one detected anomaly; and automatically updating, by the at least one processor, the database of known session interaction parameters based on the response to the interactive communication.

BRIEF DESCRIPTION OF DRAWINGS

Various embodiments of the present disclosure can be further explained with reference to the attached drawings, wherein like structures are referred to by like numerals throughout the several views. The drawings shown are not necessarily to scale, with emphasis instead generally being placed upon illustrating the principles of the present disclosure. Therefore, specific structural and functional details disclosed herein are not to be interpreted as limiting, but merely as a representative basis for teaching one skilled in the art to variously employ one or more illustrative embodiments.

DETAILED DESCRIPTION

Figure 1:
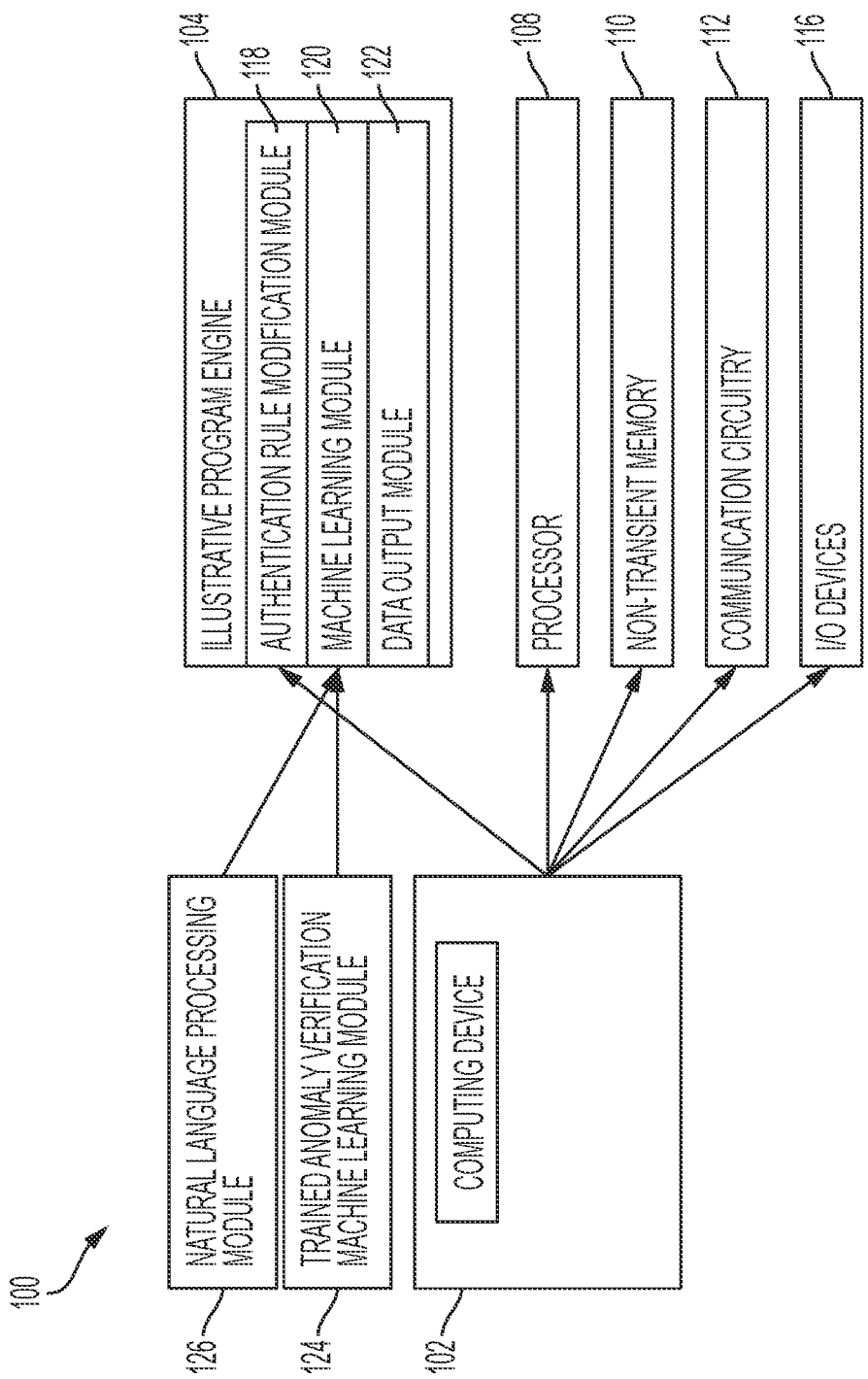
FIG. 1 depicts a block diagram of an exemplary computer-based system and platform for automatically adjusting a plurality of authentication rules associated with at least one detected anomaly, in accordance with one or more embodiments of the present disclosure.

Various detailed embodiments of the present disclosure, taken in conjunction with the accompanying figures, are disclosed herein; however, it is to be understood that the disclosed embodiments are merely illustrative. In addition, each of the examples given in connection with the various embodiments of the present disclosure is intended to be illustrative, and not restrictive.

Throughout the specification, the following terms take the meanings explicitly associated herein, unless the context clearly dictates otherwise. The phrases "in one embodiment" and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments may be readily combined, without departing from the scope or spirit of the present disclosure.

In addition, the term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the terms "and" and "or" may be used interchangeably to refer to a set of items in both the conjunctive and disjunctive in order to encompass the full description of combinations and alternatives of the items. By way of example, a set of items may be listed with the disjunctive "or", or with the conjunction "and." In either case, the set is to be interpreted as meaning each of the items singularly as alternatives, as well as any combination of the listed items.

It is understood that at least one aspect/functionality of various embodiments described herein can be performed in real-time and/or dynamically. As used herein, the term "real-time" is directed to an event/action that can occur instantaneously or almost instantaneously in time when another event/action has occurred. For example, the "real-time processing," "real-time computation," and "real-time execution" all pertain to the performance of a computation during the actual time that the related physical process (e.g., a creator interacting with an application on a mobile device) occurs, in order that results of the computation can be used in guiding the physical process.

As used herein, the term "dynamically" and term "automatically," and their logical and/or linguistic relatives and/or derivatives, mean that certain events and/or actions can be triggered and/or occur without any human intervention. In some embodiments, events and/or actions in accordance with the present disclosure can be in real-time and/or based on a predetermined periodicity of at least one of: nanosecond, several nanoseconds, millisecond, several milliseconds, second, several seconds, minute, several minutes, hourly, daily, several days, weekly, monthly, etc.

As used herein, the term "runtime" corresponds to any behavior that is dynamically determined during an execution of a software application or at least a portion of a software application.

Embodiments of the present disclosure recognize at least one technological computer-centered problem associated with verifying an identity associated with a particular interaction session parameter (i.e., phone number). An illustrative technological computer-centered problem associated with the verification of the identity associated with the particular interaction session parameter arises when a software application stored on in the background of a computing device (i.e., phone) suffers a lapse in operation for a period of time where one may assume that ownership of the particular interaction session has shifted to a different individual and/or entity. The illustrative technological computer-centered problem increases potential security risks associated with allowing any action associated with the particular interaction session parameter without the verification of the identity associated with the particular interaction session parameter. As detailed in at least some embodiments herein, at least one technological computer-centered solution associated with the illustrative technological computer-centered problem may be a dynamic utilization of a machine learning module to verify a detected anomaly associated with the lapse in operation associated with the common session parameter and determine a plurality of authentication rules associated with the detected anomaly based on a pre-generated database of authentication rules. In some embodiments, the present disclosure may obtain a permission from each user in a plurality of users to monitor a plurality of activities. In some embodiments, the present disclosure may continually receive monitoring data of the plurality of activities executed within the plurality of computing devices. In some embodiments, the present disclosure may automatically verify at least one common session parameter associated with the interaction session database to identify a plurality of interaction sessions. In some embodiments, the present disclosure may utilize a particular software application to access an interaction session database. In some embodiments, the present disclosure may identify at least one interruption associated with the software application for a different predetermined period of time. In some embodiments, the present disclosure may utilize a trained anomaly verification machine learning module to verify the detected anomaly based on the at least one common session parameter of the plurality of incoming interaction sessions. In some embodiments, the present disclosure may determine a plurality of authentication rules associated with the at least one detected anomaly and the at least one computing device of the plurality of the computing devices associated with the plurality of users based on a pre-generated database of authentication rules. In some embodiments, the present disclosure may automatically adjust the plurality of authentication rules associated with the at least one detected anomaly based on a determination that the at least one detected anomaly occurred during the different predetermined period of time. In some embodiments, the present disclosure may automatically update the database of known session interaction parameters based on the response to the interactive communication.

FIG. 1 depicts a block diagram of an exemplary computer-based system and platform for automatically adjusting a plurality of authentication rules associated with at least one detected anomaly, in accordance with one or more embodiments of the present disclosure.

In some embodiments, an illustrative computing system 100 of the present disclosure may include a computing device 102 associated with at least one user and an illustrative program engine 104. In some embodiments, the illustrative program engine 104 may be stored on the computing device 102. In some embodiments, the illustrative program engine 104 may be stored on the computing device 102, which may include a processor 108, a non-transitory memory 110, a communication circuitry 112 for communicating over a communication network 114 (not shown), and input and/or output (I/O) devices 116 such as a keyboard, mouse, a touchscreen, and/or a display, for example. In some embodiments, the computing device 102 may refer to at least one calling-enabled computing device of a plurality of calling-enabled computing devices.

In some embodiments, the illustrative program engine 104 may be configured to instruct the processor 108 to execute one or more software modules such as, without limitation, an exemplary authentication rule modification module 118, a machine-learning module 120, and/or a data output module 122.

In some embodiments, an exemplary authentication rule modification module 118 of the present disclosure, utilizes a least one machine learning algorithm, described herein, to determine a plurality of authentication rules associated with the at least one detected anomaly and automatically adjust a plurality of authentication rules associated with at least one detected anomaly. In certain embodiments, the detected anomaly may refer to an interruption in service associated with a background software application stored on a computing device 102 associated with at least one user. In some embodiments, the exemplary authentication rule modification module 118 may utilize the background software application to access an interaction session database. In certain embodiments, the interaction session database may refer to a call log stored on a smart phone associated with at least one user. In some embodiments, the exemplary authentication rule modification module 118 may obtain a permission from each user in a plurality of users to monitor a plurality of activities executed within a plurality of computing devices associated with the plurality of users. In some embodiments, the exemplary authentication rule modification module 118 may obtain the permission via each respective instance of at least one graphical user interface (GUI) having at least one programmable GUI element. In some embodiments, the exemplary authentication rule modification module 118 may continually receive monitoring data associated with the plurality of activities executed with the computing device 102 for a predetermined period of time. In certain embodiments, the predetermined period of time may refer to months, years, and/or weeks. In certain embodiments, the monitoring data may refer to a plurality of information associated with a plurality on interaction sessions. For example, the monitoring data may refer to texts, calls, emails, and ownership changes. In some embodiments, the exemplary authentication rule modification module 118 may automatically verify at least one common session parameter associated with an interaction session database to identify a plurality of incoming interaction sessions. In some embodiments, the exemplary authentication rule modification module 118 may automatically verify at least one common session parameter associated with an interaction session database when the at least one common session interaction parameter is associated with at least one of a particular entity, particular individual, and/or a particular physical location based on a database of known session interaction parameters. In some embodiments, the exemplary authentication rule modification module 118 may utilize a particular software application to access the interaction session database, where the particular software application may be configured to access a call log associated with the computing device 102. In some embodiments, the exemplary authentication rule modification module 118 may identify at least one interruption associated with the particular software application for a different predetermined period of time. In certain embodiments, the different predetermined period of time is directly linked to the time the particular software application is running in the background of the computing device 102. In some embodiments, the exemplary authentication rule modification module 118 may utilize a trained anomaly verification machine learning module 124, stored within machine learning module 120, to verify the detected anomaly. In some embodiments, the exemplary authentication rule modification module 118 may verify the detected anomaly based on the at least one common session interaction parameter of the plurality of incoming interaction sessions. In some embodiments, the exemplary authentication rule modification module 118 may determine the plurality of authentication rules associated with the at least one detected anomaly and the computing device 102 based on a pre-generated database of authentication rules. In certain embodiments, the plurality of authentication steps may refer to a predetermined number of steps required to authenticate at least one transaction associated with the computing device 102. In some embodiments, the exemplary authentication rule modification module 118 may automatically adjust the plurality of authentication rules associated with the at least one detected anomaly based on a determination that the at least one detected anomaly occurred during the different predetermined period of time. In some embodiments, the exemplary authentication rule modification module 118 may receive a response to an interactive communication associated with an adjustment to the plurality of authentication rules associated with the at least one detected anomaly. In some embodiments, the exemplary authentication rule modification module 118 may automatically update the database of known session interaction parameters. In some embodiments, the exemplary authentication rule modification module 118 may utilize a natural language processing module 126 to automatically generate at least one interaction notification for transmission to the computing device 102. In some embodiments, the exemplary authentication rule modification module 118 may retrain the machine learning module 120 in response to the adjustment of the plurality of authentication rules to increase the number of steps required to authenticate a transaction. In some embodiments, the exemplary authentication rule modification module 118 may utilize a GUI to display at least one pre-generated interaction notification associated with the particular software application on the computing device 102.

In some embodiments, the present disclosure describes systems for automatically utilizing at least one trained machine learning algorithm of a plurality of machine learning algorithms within the machine learning module 120 that may automatically access the interaction session database. In some embodiments, the machine learning module 120 may identify the at least one interruption associated with the particular software application during the second predetermined period of time. In some embodiments, the machine learning module 120 may verify the detect anomaly based on the at least one common session interaction parameter of the plurality of incoming interaction sessions. In certain embodiments, the machine learning module 120 may utilize the trained anomaly verification machine learning module 124 to verify the detect anomaly based on the at least one common session interaction parameter of the plurality of incoming interaction sessions.

In some embodiments, the machine learning module 120 may determine a plurality of authentication rules associated with the at least one detected anomaly and the computing device 102 based on a pre-generated database of authentication rules. In certain embodiments, the pre-generated database of authentication rules may be stored on the server computing device 106. In some embodiments, the machine learning module 120 may automatically adjust plurality of authentication rules associated with the at least one detected anomaly based on a determination that the at least one detected anomaly occurred during the second predetermined period of time. In some embodiments, the machine learning module 120 may receive the response to the interactive communication associated with an adjustment to the plurality of authentication rules associated with the at least one detected anomaly. In some embodiments, the machine learning module 120 may automatically update the database of known session interaction parameters based on the response to the interactive communication.

In some embodiments, the data output module 122 may identify the at least one interruption associated with the particular software application for the second predetermined period of time. In some embodiments, the data output module 122 may verify the detected anomaly based on the at least one common session parameter of the plurality of incoming interaction sessions. In some embodiments, the data output module 122 may determine the plurality of authentication rules associated with the at least one detected anomaly and the computing device 102 based on a pre-generated database of authentication rules. In some embodiments, the data output module 122 may automatically adjust the plurality of authentication rules associated with the at least one detected anomaly based on the determination that the at least one detected anomaly occurred during the second predetermined period of time. In some embodiments, the data output module 122 may receive a response to an interactive communication associated with an adjustment to the plurality of authentication rules associated with the at least one detected anomaly. In some embodiments, the data output module 122 may automatically update the database of known session interaction parameters based on the response to the interactive communication.

In some embodiments, the illustrative program engine 104 may obtain a permission from each user in a plurality of users to monitor a plurality of activities executed within a plurality of computing devices associated with the plurality of users. In some embodiments, the illustrative program engine 104 may continually receive monitoring data associated with the plurality of activities executed with the computing device 102 for a predetermined period of time. In some embodiments, the illustrative program engine 104 may automatically verify at least one common session parameter associated with an interaction session database to identify a plurality of incoming interaction sessions. In some embodiments, the illustrative program engine 104 may utilize a particular software application to access the interaction session database, where the particular software application may be configured to access a call log associated with the computing device 102. In some embodiments, the illustrative program engine 104 may identify at least one interruption associated with the particular software application for a second predetermined period of time. In some embodiments, the illustrative program engine 104 may utilize a trained anomaly verification machine learning module 124, stored within machine learning module 120, to verify the detected anomaly. In some embodiments, the illustrative program engine 104 may verify the detected anomaly based on the at least one common session interaction parameter of the plurality of incoming interaction sessions. In some embodiments, the illustrative program engine 104 may determine the plurality of authentication rules associated with the at least one detected anomaly and the computing device 102 based on a pre-generated database of authentication rules. In some embodiments, the illustrative program engine 104 may automatically adjust the plurality of authentication rules associated with the at least one detected anomaly based on a determination that the at least one detected anomaly occurred during the different predetermined period of time. In some embodiments, the illustrative program engine 104 may receive a response to an interactive communication associated with an adjustment to the plurality of authentication rules associated with the at least one detected anomaly. In some embodiments, the illustrative program engine 104 may automatically update the database of known session interaction parameters. In some embodiments, the illustrative program engine 104 may utilize a natural language processing module 126 to automatically generate at least one interaction notification for transmission to the computing device 102. In some embodiments, the illustrative program engine 104 may retrain the machine learning module 120 in response to the adjustment of the plurality of authentication rules to increase the number of steps required to authenticate a transaction. In some embodiments, the illustrative program engine 104 may utilize a GUI to display at least one pre-generated interaction notification associated with the particular software application on the computing device 102.

In some embodiments, the non-transitory memory 110 may store the obtained permission from each user of the plurality of users. In some embodiments, the non-transitory memory 110 may store the monitoring data of the plurality of activities executed within the first predetermined period of time. In some embodiments, the non-transitory memory 110 may store the at least one common session interaction parameter associated with the plurality of incoming interaction sessions. In some embodiments, the non-transitory memory 110 may store the at least one interruption associated with the at least one software application. In some embodiments, the non-transitory memory 110 may store a verification of the detected anomaly based on the at least one common session interaction parameter. In some embodiments, the determined plurality of authentication rules associated with the detected anomaly. In some embodiments, the non-transitory memory 110 may store at least one adjustment to the plurality of authentication rules. In some embodiments, the non-transitory memory 110 may store the response to an interactive communication associated with the adjustment of the plurality of authentication rules.

Figure 2:
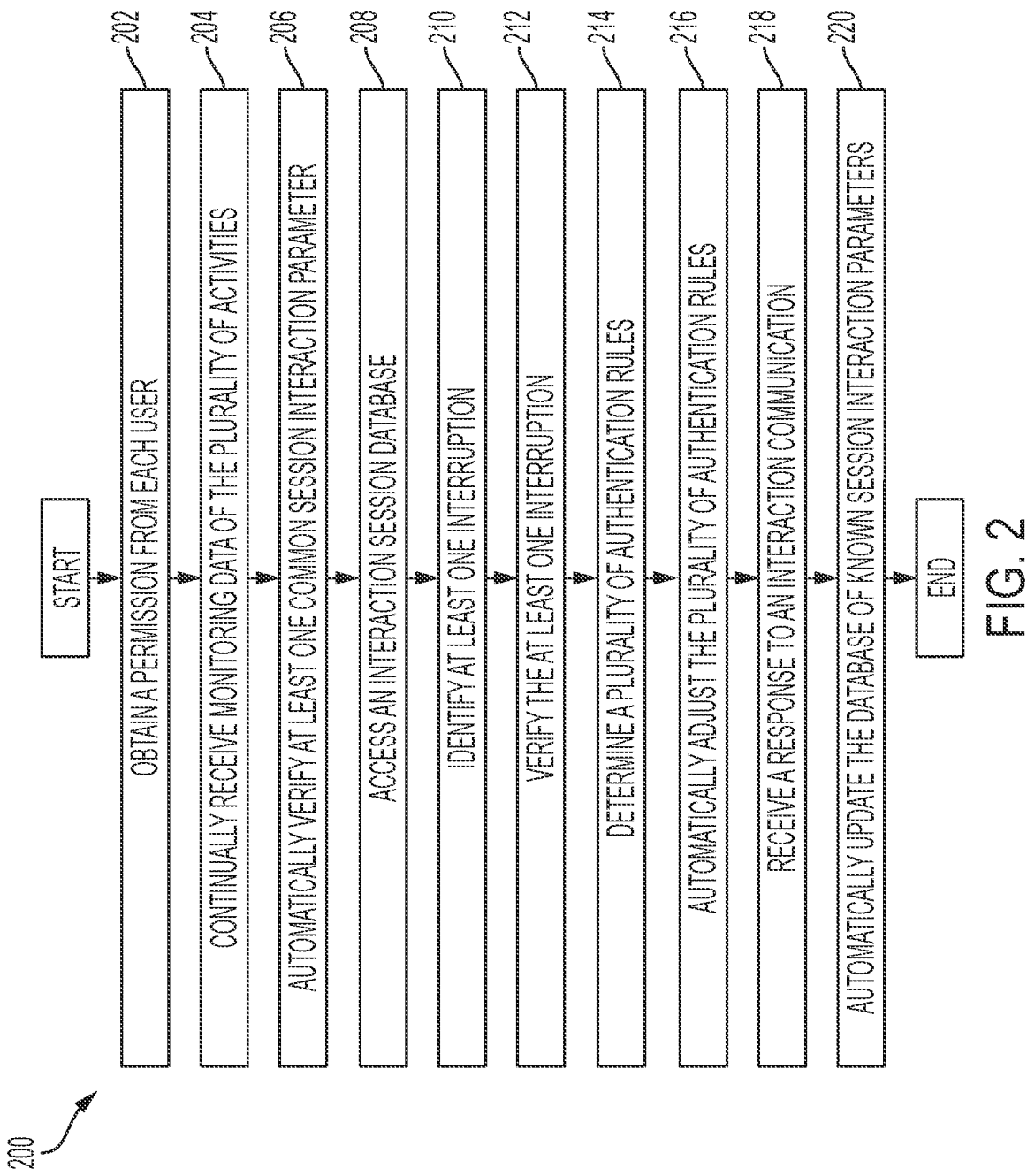
FIG. 2 is a flowchart illustrating operational steps for automatically adjusting a plurality of authentication rules associated with at least one detected anomaly, in accordance with one or more embodiments of the present disclosure.

FIG. 2 is a flowchart 200 illustrating operational steps for automatically adjusting a plurality of authentication rules associated with at least one detected anomaly, in accordance with one or more embodiments of the present disclosure.

In step 202, the illustrative program engine 104 within the computing device 102 may be programmed to obtain a permission from each user. In some embodiments, the illustrative program engine 104 may obtain the permission from each user in the plurality of users. In some embodiments, the illustrative program engine 104 may obtain the permission to monitor a plurality of activities executed within the computing device 102. In certain embodiments, the illustrative program engine 104 may obtain the permission to monitor a plurality of activities executed within a plurality of computing devices associated with the plurality of users. In some embodiments, the illustrative program engine 104 may utilize each respective instance of at least one GUI having at least one programmable GUI element to obtain the permission from each user in the plurality of users. In some embodiments, the exemplary authentication rule modification module 118 may obtain the permission from each user in the plurality of users to monitor the plurality of activities executed within the computing device 102.

In step 204, the illustrative program engine 104 may continually receive monitoring data of the plurality of activities. In some embodiments, the illustrative program engine 104 may continually receive monitoring data of the plurality of activities executed within the computing device 102. In some embodiments, the illustrative program engine 104 may continually receive monitoring data of the plurality of activities executed within the plurality of computing devices for a first predetermined period of time. In certain embodiments, the first predetermined period of time is directly linked to the permission to monitor the plurality of activities. For example, the first predetermined period of time may refer to seconds, minutes, hours, days, weeks, and months. In some embodiments, the exemplary authentication rule modification module 118 may continually receive monitoring data of the plurality of activities executed within the plurality of computing devices for the first predetermined period of time.

In step 206, the illustrative program engine 104 may automatically verify at least one common session interaction parameter. In some embodiments, the illustrative program engine 104 may automatically verify the at least one common session parameter associated with the interaction session database. In some embodiments, the illustrative program engine 104 may automatically verify the at least one common session parameter associated with the interaction session database to identify a plurality of incoming interaction sessions. In certain embodiments, the at least one common session parameter may refer to a session initiation protocol certificate associated with the at least one user. In another embodiment, the common session parameter may refer to an account number associated with the identity of the at least one user of the plurality of users. In some embodiments, the illustrative program engine 104 may automatically verify the at least one common session parameter associated with the interaction session database when the at least one common session parameter is associated with at least one of a particular entity, a particular individual, or a particular physical location based on a database of known session interaction parameters. In some embodiments, the exemplary authentication rule modification module 118 may automatically verify the at least one common session parameter associated with the interaction session database to identify the plurality of incoming interaction sessions.

In step 208, the illustrative program engine 104 may access an interaction session database. In some embodiment, the illustrative program engine 104 may utilize a particular software application to access the interaction session database. In certain embodiments, the interaction session database may refer to a database of interaction sessions that occurred on the computing device 102 during the duration of the first predetermined period of time. For example, the interaction session database may refer to a call log associated with a smart phone of the at least one user. In some embodiments, the particular software application may be trained to automatically access the interaction session database via the machine learning module 120. In some embodiments, the exemplary authentication rule modification module 118 may utilize the particular software application to access the interaction session database.

In step 210, the illustrative program engine 104 may identify at least one interruption. In some embodiments, the illustrative program engine 104 may identify the at least one interruption associated with the particular software application for a second predetermined period of time. In some embodiments, the at least one interruption may refer to a detected anomaly within the interaction session database. In certain embodiments, the at least one interruption may refer to a detected anomaly within the call log associated with the computing device 102 during the second predetermined period of time. In some embodiments, the exemplary authentication rule modification module 118 may identify the at least one interruption associated with the particular software application for the second predetermined period of time.

In step 212, the illustrative program engine 104 may verify the at least one interruption. In some embodiments, the illustrative program engine 104 may verify the at least one interruption based on the at least one common session parameter associated with the plurality of incoming interaction sessions. In some embodiments, the illustrative program engine 104 may utilize a trained anomaly verification machine learning module 124 to verify the at least one interruption based on the at least one common session parameter associated with the plurality of incoming interaction sessions. In certain embodiments, the illustrative program engine 104 may utilize a trained anomaly verification machine learning module 124 to verify the detected anomaly based on the at least one common session parameter associated with the plurality of incoming interaction sessions. In some embodiments, the illustrative program engine 104 may verify the at least one interruption by storing last received source information from the particular software application based on a first monitoring protocol message received from a source node, where the source node contains metadata associated with the first monitoring protocol message; receiving a second monitoring protocol message from the source node, where the second monitoring protocol message contains received source information and metadata associated with the second monitoring protocol message; comparing the received source information to the last received source information; determining a source status has changed on a communication path from the source node to a target node; comparing the metadata associated with the second monitoring protocol message to the metadata associated with the first monitoring protocol message; determining the source status has changed on the communication path from the target node to the source node; and automatically verify the at least one interruption based on a plurality of changes associated with the source status. In some embodiments, the exemplary authentication rule modification module 118 may utilize the trained anomaly verification machine learning module 124 to verify the detected anomaly based on the at least one common session parameter associated with the plurality of incoming interaction sessions.

In step 214, the illustrative program engine 104 may determine a plurality of authentication rules. In some embodiments, the illustrative program engine 104 may determine the plurality of authentication rules associated with the at least one interruption and the computing device 102. In some embodiments, the illustrative program engine 104 may determine the plurality of authentication rules associated with the at least one interruption and the at least one computing device of the plurality of computing devices based on a pre-generated database of authentication rules. In certain embodiments, the plurality of authentication rules includes a predetermined number of steps required to authenticate at least one transaction associated with the at least one user of the plurality of users. In some embodiments, the exemplary authentication rule modification module 118 may determine the plurality of authentication rules associated with the at least one interruption and the computing device 102.

In step 216, the illustrative program engine 104 may automatically adjust the plurality of authentication rules. In some embodiments, the illustrative program engine 104 may automatically adjust associated with the at least one interruption based on a determination that the at least one interruption occurred during the second predetermined period of time. In certain embodiments, the second predetermined period of time may refer to a time the particular software application is stored on the computing device 102. In some embodiments, the automatic adjustment of the plurality of authentication rules may refer to increasing a number of authentication rules based on the at least one interruption occurring during the second predetermined period of time. In certain embodiments, the automatic adjustment of the plurality of authentication rules may refer to decreasing the number of authentication rules based on a failure to identify at least one interruption occurring during the second predetermined period of time. In certain embodiments, the illustrative program engine 104 may automatically adjust associated with the at least one interruption based on a determination that the at least one detected anomaly occurred during the second predetermined period of time. In some embodiments, the exemplary authentication rule modification module 118 may automatically adjust associated with the at least one interruption based on a determination that the at least one interruption occurred during the second predetermined period of time.

In step 218, the illustrative program engine 104 may receive a response to an interaction communication. In some embodiments, the illustrative program engine 104 may receive the response to the interaction communication associated with the adjustment to the plurality of authentication rules based on the at least one interruption. In certain embodiments, the interaction communication may refer to a generated communication that details an identification of the at least one interruption occurring during the second predetermined period of time. In certain embodiments, the response may refer to a user input response to the generated interaction communication detailing the identification of that least one interruption occurring during the second predetermined period of time. In some embodiments, the exemplary authentication rule modification module 118 may receive the response to the interaction communication associated with the adjustment to the plurality of authentication rules based on the at least one interruption.

In step 220, the illustrative program engine 104 may automatically update the database of known session interaction parameters. In some embodiments, the illustrative program engine 104 may automatically update the database of known session interaction parameters based on the response to the interaction communication. In certain embodiments, the automatic update of the database known session may refer to a validation of the identity of ownership of the common session interaction protocol or a modification to the identity of ownership associated with the computing device 102. In some embodiments, the exemplary authentication rule modification module 118 may automatically update the database of known session interaction parameters based on the response to the interaction communication.

In some embodiments, the illustrative program engine 104 may utilize the natural language processing module 126 to automatically generate at least one interaction notification for transmission to the computing device 102. In some embodiments, the illustrative program engine 104 may utilize a GUI to display at least one pre-generated interaction notification associated with the particular software application. In some embodiments, the illustrative program engine 104 may retrain the machine learning module 120 to determine that at least one user is currently engaged in a suspicious interaction session based on the adjustment to the plurality of authentication rules.

Figure 3:
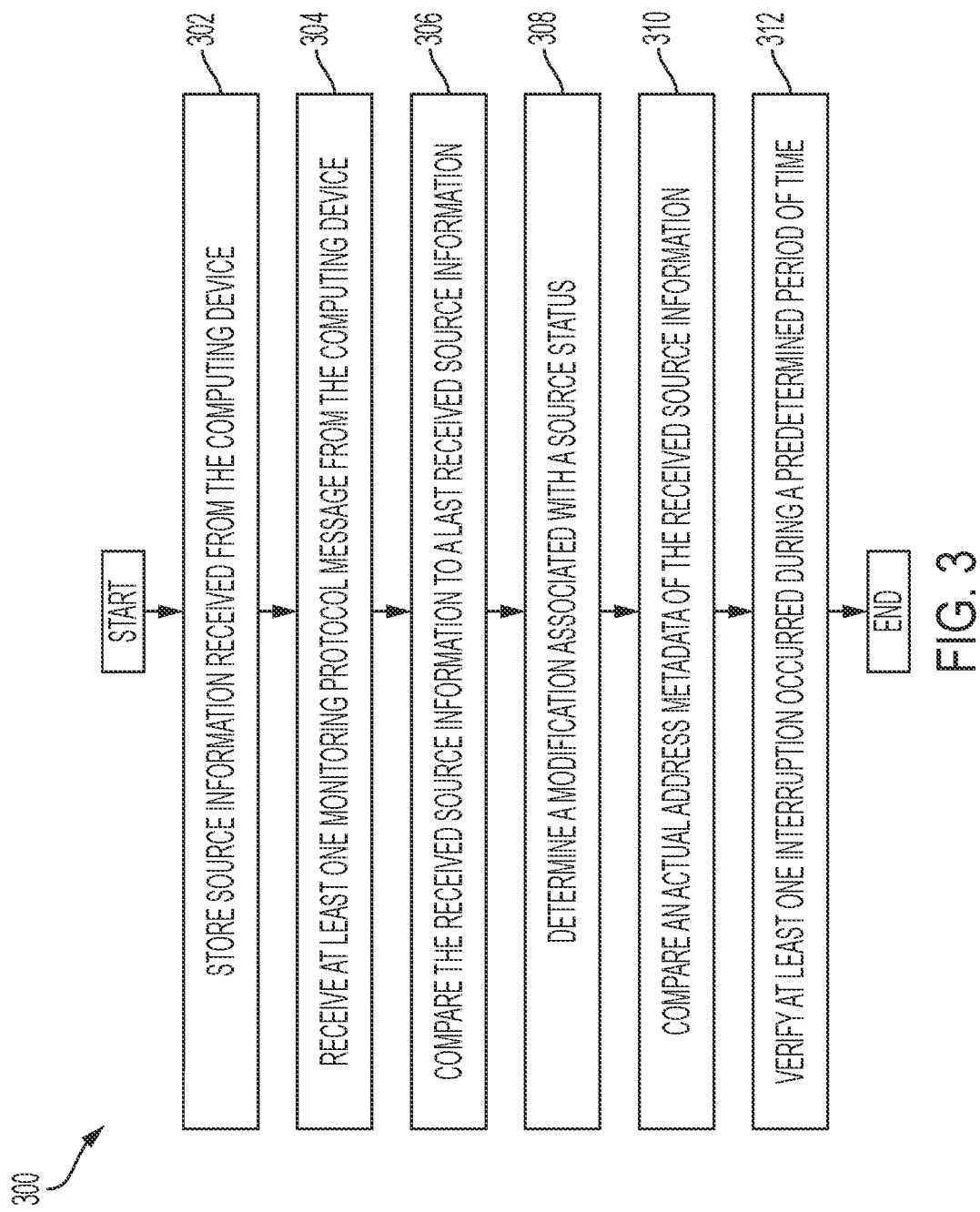
FIG. 3 is a flowchart illustrating operational steps for verifying a detected anomaly occurred during a predetermined period of time, in accordance with one or more embodiments of the present disclosure.

FIG. 3 is a flowchart 300 illustrating operations steps for verifying the at least one interruption occurred during a second predetermined period of time, in accordance with one or more embodiments of the present disclosure.

In step 302, the illustrative program engine 104 may store source information received from the computing device 102. In some embodiments, the illustrative program engine 104 may store a last received source information from the particular software application with the computing device 102. In some embodiments, the illustrative program engine 104 may store the last received source information from the particular software application based on a first monitoring protocol message received from a source node. In certain embodiments, the source node may refer to at least one datapoint capable of importing data from a variety of data packages using open database connectivity. In certain embodiments, a monitoring protocol message may refer to a digital transmission that once received alerts the server computing device 106 that the particular software application is active. In certain embodiments, the last received source information may refer to source information associated with the particular software application that occurred prior to the predetermined period of time. In certain embodiments, the source node may include metadata associated with the first monitoring protocol message. In certain embodiments, the metadata may refer to a set of data records that describe and provide additional information associated with the particular software application stored on the computing device 102. In some embodiments, the exemplary authentication rule modification module 118 may store the last received source information from the particular software application based on the first monitoring protocol message received from the source node.

In step 304, the illustrative program engine 104 may receive at least one monitoring protocol message from the computing device 102. In some embodiments, the illustrative program engine 104 may receive a second monitoring protocol message from the source node. In some embodiments, the illustrative program engine 104 may receive the second monitoring protocol message from the source node in response to storing the last received source information. In certain embodiments, the second monitoring protocol message may contain received source information and metadata associated with the second monitoring protocol message. In some embodiments, the exemplary authentication rule modification module 118 may receive the second monitoring protocol message from the source node in response to storing the last received source information.

In step 306, the illustrative program engine 104 may compare the received source information to a last received source information. In some embodiments, the illustrative program engine 104 may compare the received source information to the last received source information, where the received source information and the last received source information may be stored in a target node. In certain embodiments, the target node may refer to a logical entity, meaning no physical server corresponds to the node and/or a predefined node that corresponds to a physical server, such as the server computing device 106. In some embodiments, the exemplary authentication rule modification module 118 may compare the received source information to the last received source information, where the received source information and the last received source information may be stored in the target node.

In step 308, the illustrative program engine 104 may determine a modification associated with a source status. In some embodiments, the illustrative program engine 104 may determine at least one modification has occurred with the source status on a communication path, where the source status transitioned from the source node to the target node. In certain embodiments, the source status may be used to make a distinction between a plurality of data records that refer to active, historical, or deleted data records in a source database. In certain embodiments, the communication path may refer to a public telephone network, a wireless frequency or frequencies, any landline or landlines, cable, or other communications medium that may be used as a means of carrying a signal. In some embodiments, the exemplary authentication rule modification module 118 may determine the at least one modification has occurred with the source status on the communication path, where the source status transitioned from the source node to the target node.

In step 310, the illustrative program engine 104 may compare an actual address metadata of the received source information. In some embodiments, the illustrative program engine 104 may compare a metadata associated with the second monitoring protocol message to the metadata associated with the first monitoring protocol message. In certain embodiments, the metadata associated with the second monitoring protocol message may refer to an actual address metadata of the received source information. In some embodiments, the illustrative program engine 104 may utilize at least two comparisons of the metadata associated with the at least two protocol messages to determine any subsequent modifications to the source statues on the communication path. In some embodiments, the exemplary authentication rule modification module 118 may compare the metadata associated with the second monitoring protocol message to the metadata associated with the first monitoring protocol message.

In step 312, the illustrative program engine 104 may verify at least one interruption occurred during a predetermined period of time. In some embodiments, the illustrative program engine 104 may automatically verify the at least one interruption occurred during the predetermined period of time based on the determination of at least one modification to the source status and the comparison of the metadata associated with each protocol message. In some embodiments, the exemplary authentication rule modification module 118 may automatically verify the at least one interruption occurred during the predetermined period of time based on the determination of at least one modification to the source status and the comparison of the metadata associated with each protocol message.

Figure 4:
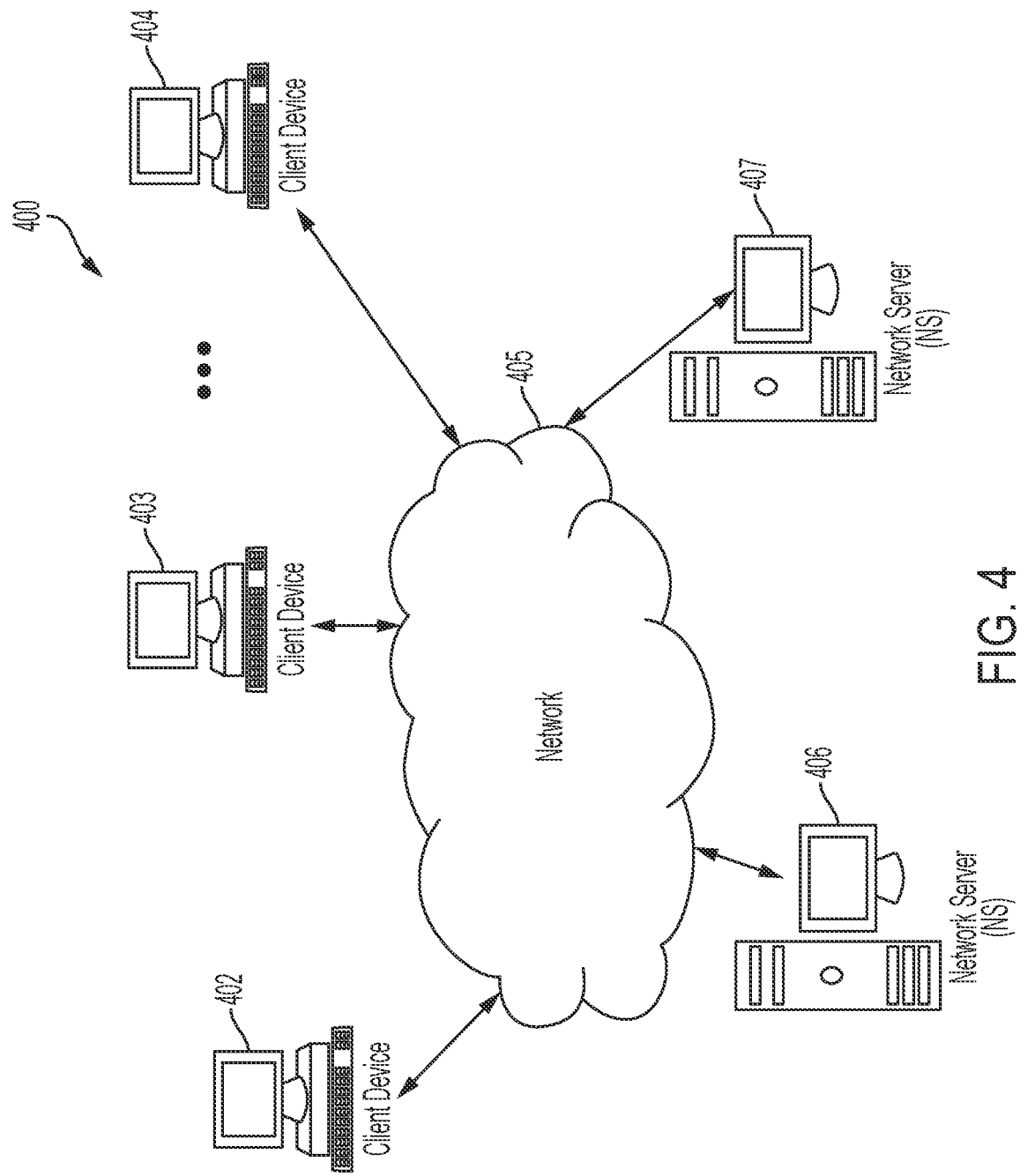
FIG. 4 depicts a block diagram of an exemplary computer-based system/platform in accordance with one or more embodiments of the present disclosure.

FIG. 4 depicts a block diagram of an exemplary computer-based system/platform 400 in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the exemplary inventive computing devices and/or the exemplary inventive computing components of the exemplary computer-based system/platform 400 may be configured to automatically adjust, by at least one processor, a plurality of authentication rules associated with the at least one interruption based on a determination that the at least one interruption occurred during a predetermined period of time, as detailed herein. In some embodiments, the exemplary computer-based system/platform 400 may be based on a scalable computer and/or network architecture that incorporates various strategies for assessing the data, caching, searching, and/or database connection pooling. An example of the scalable architecture is an architecture that is capable of operating multiple servers. In some embodiments, the exemplary inventive computing devices and/or the exemplary inventive computing components of the exemplary computer-based system/platform 400 may be configured to manage the exemplary authentication rule modification module 118 of the present disclosure, automatically utilizing at least one machine-learning model described herein.

In some embodiments, referring to FIG. 4, members 402-404 (e.g., clients) of the exemplary computer-based system/platform 400 may include virtually any computing device capable of automatically updating, dynamically removing, and automatically restoring a plurality of data records within a generated database of known queries via a network (e.g., cloud network), such as network 405, to and from another computing device, such as servers 406 and 407, each other, and the like. In some embodiments, the member devices 402-404 may be personal computers, multiprocessor systems, microprocessor-based or programmable consumer electronics, network PCs, and the like. In some embodiments, one or more member devices within member devices 402-404 may include computing devices that connect using a wireless communications medium such as cell phones, smart phones, pagers, walkie talkies, radio frequency (RF) devices, infrared (IR) devices, CBs, integrated devices combining one or more of the preceding devices, or virtually any mobile computing device, and the like. In some embodiments, one or more member devices within member devices 402-404 may be devices that are capable of connecting using a wired or wireless communication medium such as a PDA, POCKET PC, wearable computer, a laptop, tablet, desktop computer, a netbook, a video game device, a pager, a smart phone, an ultra-mobile personal computer (UMPC), and/or any other device that is equipped to communicate over a wired and/or wireless communication medium (e.g., NFC, RFID, NBIOT, 3G, 4G, 5G, GSM, GPRS, WiFi, WiMax, CDMA, satellite, ZigBee, etc.). In some embodiments, one or more member devices within member devices 402-404 may launch one or more applications, such as Internet browsers, mobile applications, voice calls, video games, videoconferencing, and email, among others. In some embodiments, one or more member devices within member devices 402-404 may be configured to receive and to send web pages, and the like. In some embodiments, an exemplary authentication rule modification module 118 of the present disclosure may be configured to receive and display graphics, text, multimedia, and the like, employing virtually any web based language, including, but not limited to Standard Generalized Markup Language (SMGL), such as HyperText Markup Language (HTML), a wireless application protocol (WAP), a Handheld Device Markup Language (HDML), such as Wireless Markup Language (WML), WMLScript, XML, JavaScript, and the like. In some embodiments, a member device within member devices 402-404 may be specifically programmed by either Java, .Net, QT, C, C++ and/or other suitable programming language. In some embodiments, one or more member devices within member devices 402-404 may be specifically programmed include or execute an application to perform a variety of possible tasks, such as, without limitation, messaging functionality, browsing, searching, playing, streaming or displaying various forms of content, including locally stored or uploaded messages, images and/or video, and/or games.

In some embodiments, the exemplary network 405 may provide network access, data transport and/or other services to any computing device coupled to it. In some embodiments, the exemplary network 405 may include and implement at least one specialized network architecture that may be based at least in part on one or more standards set by, for example, without limitation, Global System for Mobile communication (GSM) Association, the Internet Engineering Task Force (IETF), and the Worldwide Interoperability for Microwave Access (WiMAX) forum. In some embodiments, the exemplary network 405 may implement one or more of a GSM architecture, a General Packet Radio Service (GPRS) architecture, a Universal Mobile Telecommunications System (UMTS) architecture, and an evolution of UMTS referred to as Long Term Evolution (LTE). In some embodiments, the exemplary network 405 may include and implement, as an alternative or in conjunction with one or more of the above, a WiMAX architecture defined by the WiMAX forum. In some embodiments and, optionally, in combination of any embodiment described above or below, the exemplary network 405 may also include, for instance, at least one of a local area network (LAN), a wide area network (WAN), the Internet, a virtual LAN (VLAN), an enterprise LAN, a layer 3 virtual private network (VPN), an enterprise IP network, or any combination thereof. In some embodiments and, optionally, in combination of any embodiment described above or below, at least one computer network communication over the exemplary network 405 may be transmitted based at least in part on one of more communication modes such as but not limited to: NFC, RFID, Narrow Band Internet of Things (NBIOT), ZigBee, 3G, 4G, 5G, GSM, GPRS, WiFi, WiMax, CDMA, satellite and any combination thereof. In some embodiments, the exemplary network 405 may also include mass storage, such as network attached storage (NAS), a storage area network (SAN), a content delivery network (CDN) or other forms of computer or machine-readable media.

In some embodiments, the exemplary server 406 or the exemplary server 407 may be a web server (or a series of servers) running a network operating system, examples of which may include but are not limited to Microsoft Windows Server, Novell NetWare, or Linux. In some embodiments, the exemplary server 406 or the exemplary server 407 may be used for and/or provide cloud and/or network computing. Although not shown in FIG. 4, in some embodiments, the exemplary server 406 or the exemplary server 407 may have connections to external systems like email, SMS messaging, text messaging, ad content providers, etc. Any of the features of the exemplary server 406 may be also implemented in the exemplary server 407 and vice versa.

In some embodiments, one or more of the exemplary servers 406 and 407 may be specifically programmed to perform, in non-limiting example, as authentication servers, search servers, email servers, social networking services servers, SMS servers, IM servers, MMS servers, exchange servers, photo-sharing services servers, advertisement providing servers, financial/banking-related services servers, travel services servers, or any similarly suitable service-base servers for users of the member computing devices 401-404.

In some embodiments and, optionally, in combination of any embodiment described above or below, for example, one or more exemplary computing member devices 402-404, the exemplary server 406, and/or the exemplary server 407 may include a specifically programmed software module that may be configured to store a last received source information from the particular software application based on a first monitoring protocol message received from a source node, where the source node contains metadata associated with the first monitoring protocol message; receive a second monitoring protocol message from the source node, where the second monitoring protocol message contains received source information and metadata associated with the second monitoring protocol message; compare the received source information to the last received source information; determine a source status has changed on a communication path from the source node to a target node; compare the metadata associated with the second monitoring protocol message to the metadata associated with the first monitoring protocol message; determine the source status has changed on the communication path from the target node to the source node; and automatically verify the at least one interruption based on a plurality of changes associated with the source status.

Figure 5:
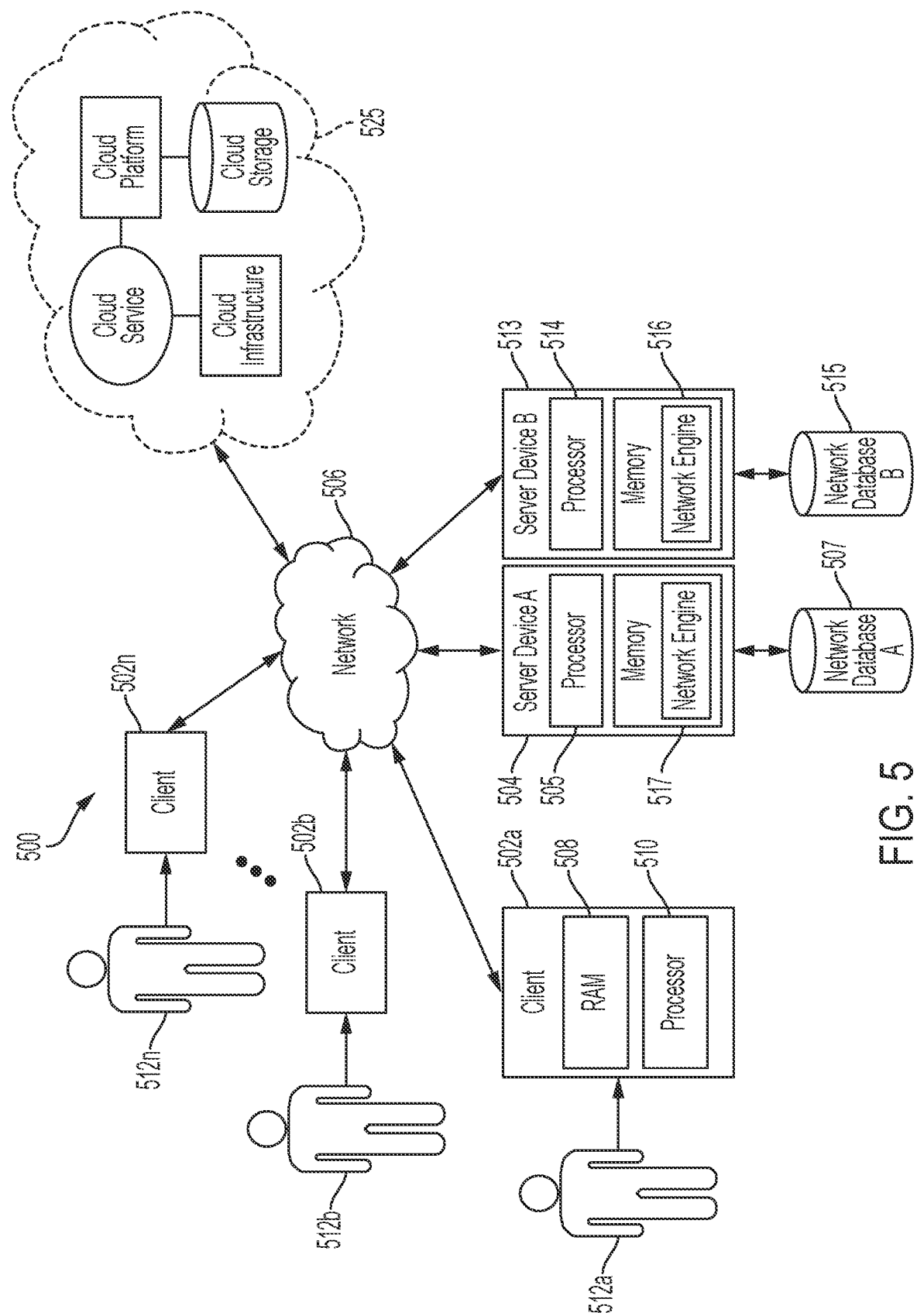
FIG. 5 depicts a block diagram of another exemplary computer-based system/platform in accordance with one or more embodiments of the present disclosure.

FIG. 5 depicts a block diagram of another exemplary computer-based system/platform 500 in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the member computing devices 502*a*, 502*b* thru 502*n* shown each at least includes a computer-readable medium, such as a random-access memory (RAM) 508 coupled to a processor 510 or FLASH memory. In some embodiments, the processor 510 may execute computer-executable program instructions stored in memory 508. In some embodiments, the processor 510 may include a microprocessor, an ASIC, and/or a state machine. In some embodiments, the processor 510 may include, or may be in communication with, media, for example computer-readable media, which stores instructions that, when executed by the processor 510, may cause the processor 510 to perform one or more steps described herein. In some embodiments, examples of computer-readable media may include, but are not limited to, an electronic, optical, magnetic, or other storage or transmission device capable of providing a processor, such as the processor 510 of client 502*a*, with computer-readable instructions. In some embodiments, other examples of suitable media may include, but are not limited to, a floppy disk, CD-ROM, DVD, magnetic disk, memory chip, ROM, RAM, an ASIC, a configured processor, all optical media, all magnetic tape or other magnetic media, or any other medium from which a computer processor can read instructions. Also, various other forms of computer-readable media may transmit or carry instructions to a computer, including a router, private or public network, or other transmission device or channel, both wired and wireless. In some embodiments, the instructions may comprise code from any computer-programming language, including, for example, C, C++, Visual Basic, Java, Python, Perl, JavaScript, and etc.

In some embodiments, member computing devices 502*a* through 502*n* may also comprise a number of external or internal devices such as a mouse, a CD-ROM, DVD, a physical or virtual keyboard, a display, a speaker, or other input or output devices. In some embodiments, examples of member computing devices 502*a* through 502*n* (e.g., clients) may be any type of processor-based platforms that are connected to a network 506 such as, without limitation, personal computers, digital assistants, personal digital assistants, smart phones, pagers, digital tablets, laptop computers, Internet appliances, and other processor-based devices. In some embodiments, member computing devices 502*a* through 502*n* may be specifically programmed with one or more application programs in accordance with one or more principles/methodologies detailed herein. In some embodiments, member computing devices 502*a* through 502*n* may operate on any operating system capable of supporting a browser or browser-enabled application, such as Microsoft™, Windows™, and/or Linux. In some embodiments, member computing devices 502*a* through 502*n* shown may include, for example, personal computers executing a browser application program such as Microsoft Corporation's Internet Explorer™, Apple Computer, Inc.'s Safari™, Mozilla Firefox, and/or Opera. In some embodiments, through the member computing client devices 502*a* through 502*n*, users, 512*a* through 512*n*, may communicate over the exemplary network 506 with each other and/or with other systems and/or devices coupled to the network 506. As shown in FIG. 5, exemplary server devices 504 and 513 may be also coupled to the network 506. Exemplary server device 504 may include a processor 505 coupled to a memory that stores a network engine 517. Exemplary server device 513 may include a processor 514 coupled to a memory 516 that stores a network engine. In some embodiments, one or more member computing devices 502*a* through 502*n* may be mobile clients. As shown in FIG. 5, the network 506 may be coupled to a cloud computing/architecture(s) 525. The cloud computing/architecture(s) 525 may include a cloud service coupled to a cloud infrastructure and a cloud platform, where the cloud platform may be coupled to a cloud storage.

In some embodiments, at least one database of exemplary databases 507 and 515 may be any type of database, including a database managed by a database management system (DBMS). In some embodiments, an exemplary DBMS-managed database may be specifically programmed as an engine that controls organization, storage, management, and/or retrieval of data in the respective database. In some embodiments, the exemplary DBMS-managed database may be specifically programmed to provide the ability to query, backup and replicate, enforce rules, provide security, compute, perform change and access logging, and/or automate optimization. In some embodiments, the exemplary DBMS-managed database may be chosen from Oracle database, IBM DB2, Adaptive Server Enterprise, FileMaker, Microsoft Access, Microsoft SQL Server, MySQL, PostgreSQL, and a NoSQL implementation. In some embodiments, the exemplary DBMS-managed database may be specifically programmed to define each respective schema of each database in the exemplary DBMS, according to a particular database model of the present disclosure which may include a hierarchical model, network model, relational model, object model, or some other suitable organization that may result in one or more applicable data structures that may include fields, records, files, and/or objects. In some embodiments, the exemplary DBMS-managed database may be specifically programmed to include metadata about the data that is stored.

Figure 6:
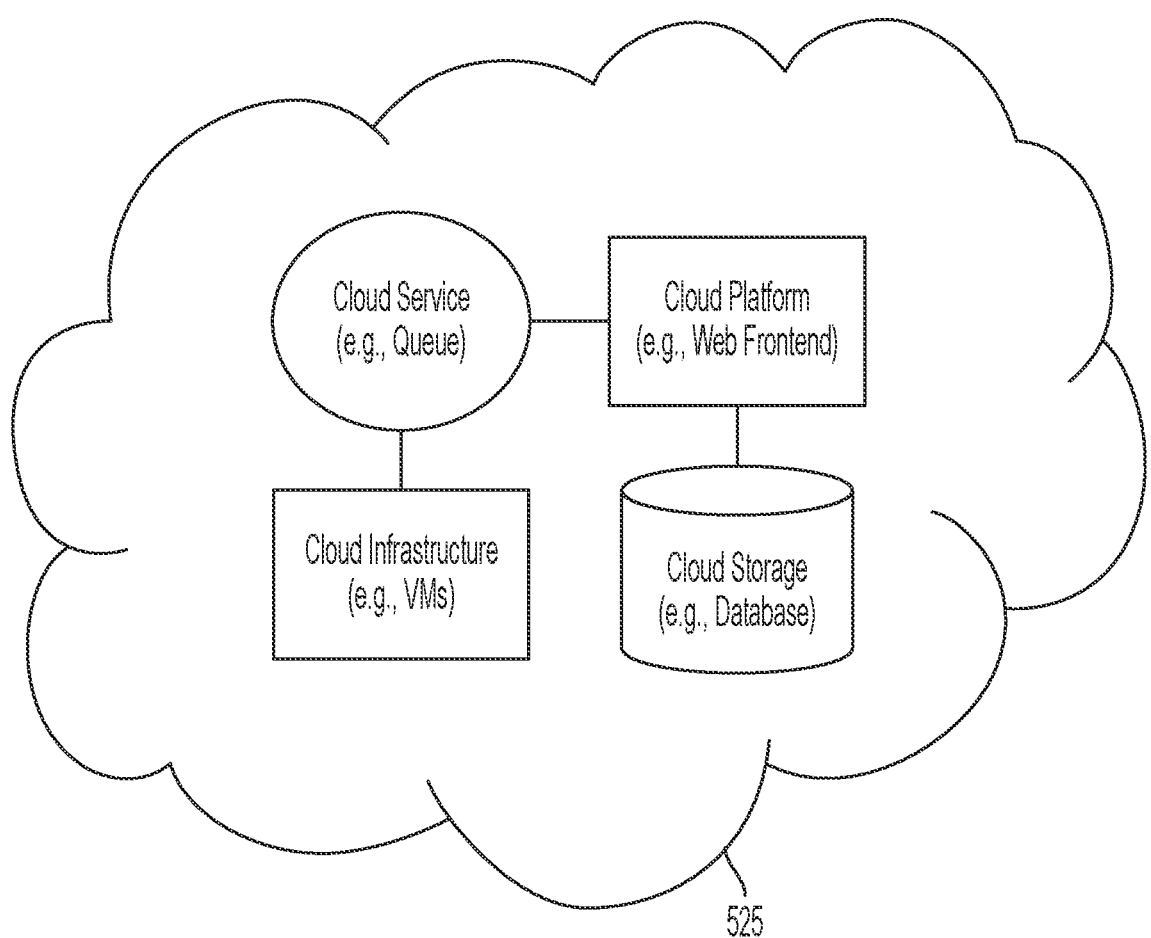
FIGS. 6 and 7 are diagrams illustrating implementations of cloud computing architecture/aspects with respect to which the disclosed technology may be specifically configured to operate, in accordance with one or more embodiments of the present disclosure.
Figure 7:
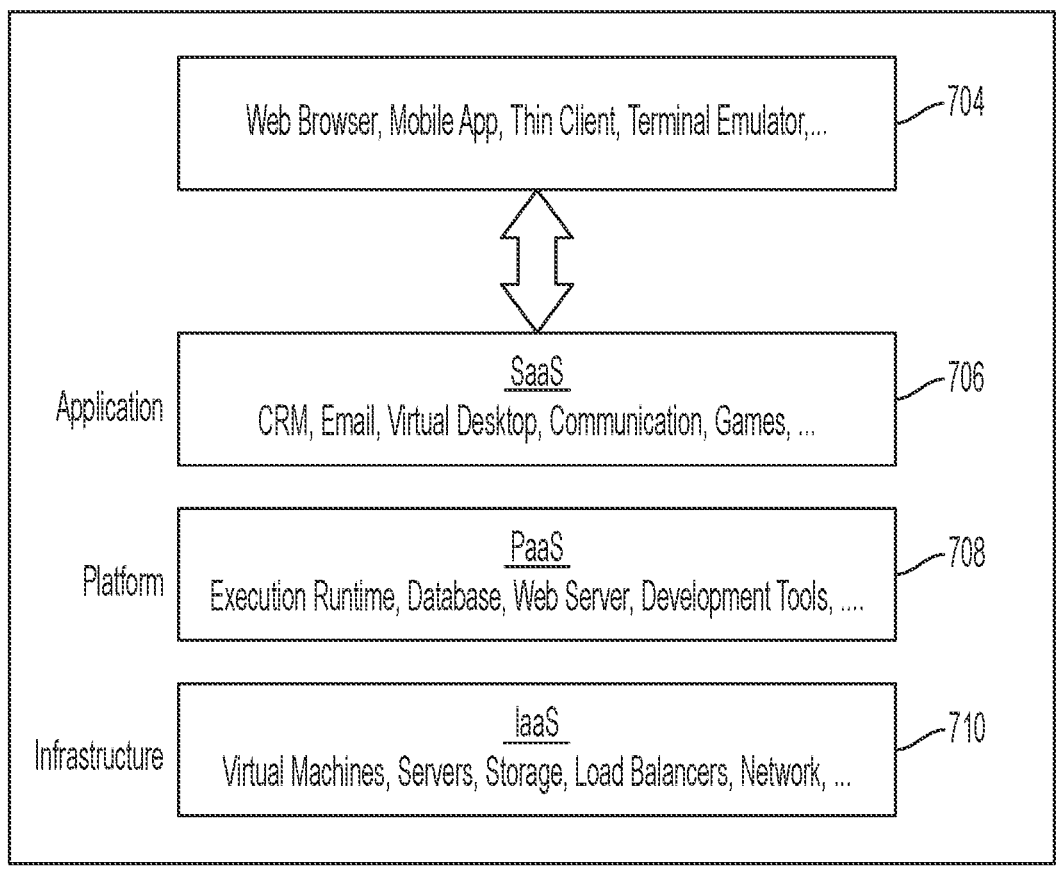

FIG. 6 and FIG. 7 illustrate schematics of exemplary implementations of the cloud computing/architecture(s) in which the exemplary inventive computer-based systems/platforms, the exemplary inventive computer-based devices, and/or the exemplary inventive computer-based components of the present disclosure may be specifically configured to operate. FIG. 6 illustrates an expanded view of the cloud computing/architecture(s) 525 found in FIG. 5. FIG. 7. illustrates the exemplary inventive computer-based components of the present disclosure may be specifically configured to operate in the cloud computing/architecture 525 as a source database 704, where the source database 704 may be a web browser. a mobile application, a thin client, and a terminal emulator. In FIG. 7, the exemplary inventive computer-based systems/platforms, the exemplary inventive computer-based devices, and/or the exemplary inventive computer-based components of the present disclosure may be specifically configured to operate in an cloud computing/ architecture such as, but not limiting to: infrastructure a service (IaaS) 710, platform as a service (PaaS) 708, and/or software as a service (SaaS) 706.

In some embodiments and, optionally, in combination with any embodiment described above or below, the exemplary trained neural network model may specify a neural network by at least a neural network topology, a series of activation functions, and connection weights. For example, the topology of a neural network may include a configuration of nodes of the neural network and connections between such nodes. In some embodiments and, optionally, in combination with any embodiment described above or below, the exemplary trained neural network model may also be specified to include other parameters, including but not limited to, bias values/functions and/or aggregation functions. For example, an activation function of a node may be a step function, sine function, continuous or piecewise linear function, sigmoid function, hyperbolic tangent function, or other type of mathematical function that represents a threshold at which the node is activated. In some embodiments and, optionally, in combination with any embodiment described above or below, the exemplary aggregation function may be a mathematical function that combines (e.g., sum, product, etc.) input signals to the node. In some embodiments and, optionally, in combination with any embodiment described above or below, an output of the exemplary aggregation function may be used as input to the exemplary activation function. In some embodiments and, optionally, in combination with any embodiment described above or below, the bias may be a constant value or function that may be used by the aggregation function and/or the activation function to make the node more or less likely to be activated.

The material disclosed herein may be implemented in software or firmware or a combination of them or as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; knowledge corpus; stored audio recordings; flash memory devices; electrical, optical, acoustical or other forms of propagated signals (e.g., carrier waves, infrared signals, digital signals, etc.), and others.

As used herein, the terms "computer engine" and "engine" identify at least one software component and/or a combination of at least one software component and at least one hardware component which are designed/programmed/configured to manage/control other software and/or hardware components (such as the libraries, software development kits (SDKs), objects, etc.).

Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. In some embodiments, the one or more processors may be implemented as a Complex Instruction Set Computer (CISC) or Reduced Instruction Set Computer (RISC) processors; x86 instruction set compatible processors, multi-core, or any other microprocessor or central processing unit (CPU). In various implementations, the one or more processors may be dual-core processor(s), dual-core mobile processor(s), and so forth.

Computer-related systems, computer systems, and systems, as used herein, include any combination of hardware and software. Examples of software may include software components, operating system software, middleware, firmware, software modules, routines, subroutines, functions, methods, procedures, software interfaces, application program interfaces (API), instruction sets, computer code, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that make the logic or processor. Of note, various embodiments described herein may, of course, be implemented using any appropriate hardware and/or computing software languages (e.g., C++, Objective-C, Swift, Java, JavaScript, Python, Perl, QT, etc.).

In some embodiments, one or more of exemplary inventive computer-based systems/platforms, exemplary inventive computer-based devices, and/or exemplary inventive computer-based components of the present disclosure may include or be incorporated, partially or entirely into at least one personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

As used herein, the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. In some embodiments, the server may store transactions and dynamically trained machine learning models. Cloud servers are examples.

In some embodiments, as detailed herein, one or more of exemplary inventive computer-based systems/platforms, exemplary inventive computer-based devices, and/or exemplary inventive computer-based components of the present disclosure may obtain, manipulate, transfer, store, transform, generate, and/or output any digital object and/or data unit (e.g., from inside and/or outside of a particular application) that can be in any suitable form such as, without limitation, a file, a contact, a task, an email, a social media post, a map, an entire application (e.g., a calculator), etc. In some embodiments, as detailed herein, one or more of exemplary inventive computer-based systems/platforms, exemplary inventive computer-based devices, and/or exemplary inventive computer-based components of the present disclosure may be implemented across one or more of various computer platforms such as, but not limited to: (1) FreeBSD™, NetBSD™, OpenBSD™; (2) Linux™; (3) Microsoft Windows™; (4) OS X (MacOS)™; (5) MacOS 11™; (6) Solaris™; (7) Android™; (8) iOS™; (9) Embedded Linux™; (10) Tizen™; (11) WebOS™; (12) IBM i™; (13) IBM AIX™; (14) Binary Runtime Environment for Wireless (BREW)™; (15) Cocoa (API)™; (16) Cocoa Touch™; (17) Java Platforms™; (18) JavaFX™; (19) JavaFX Mobile;™ (20) Microsoft DirectX™; (21).NET Framework™; (22) Silverlight™; (23) Open Web Platform™; (24) Oracle Database™; (25) Qt™; (26) Eclipse Rich Client Platform™; (27) SAP NetWeaver™; (28) Smartface™; and/or (29) Windows Runtime™.

In some embodiments, exemplary inventive computer-based systems/platforms, exemplary inventive computer-based devices, and/or exemplary inventive computer-based components of the present disclosure may be configured to utilize hardwired circuitry that may be used in place of or in combination with software instructions to implement features consistent with principles of the disclosure. Thus, implementations consistent with principles of the disclosure are not limited to any specific combination of hardware circuitry and software. For example, various embodiments may be embodied in many different ways as a software component such as, without limitation, a stand-alone software package, a combination of software packages, or it may be a software package incorporated as a "tool" in a larger software product.

For example, exemplary software specifically programmed in accordance with one or more principles of the present disclosure may be downloadable from a network, for example, a website, as a stand-alone product or as an add-in package for installation in an existing software application. For example, exemplary software specifically programmed in accordance with one or more principles of the present disclosure may also be available as a client-server software application, or as a web-enabled software application. For example, exemplary software specifically programmed in accordance with one or more principles of the present disclosure may also be embodied as a software package installed on a hardware device. In at least one embodiment, the exemplary authentication rule modification module 118 of the present disclosure, utilizing at least one machine-learning model described herein, may be referred to as exemplary software.

In some embodiments, exemplary inventive computer-based systems/platforms, exemplary inventive computer-based devices, and/or exemplary inventive computer-based components of the present disclosure may be configured to handle numerous concurrent tests for software agents that may be, but is not limited to, at least 100 (e.g., but not limited to, 100-999), at least 1,000 (e.g., but not limited to, 1,000-9,999), at least 10,000 (e.g., but not limited to, 10,000-99,999), at least 100,000 (e.g., but not limited to, 100,000-999,999), at least 1,000,000 (e.g., but not limited to, 1,000,000-9,999,999), at least 10,000,000 (e.g., but not limited to, 10,000,000-99,999,999), at least 100,000,000 (e.g., but not limited to, 100,000,000-999,999,999), at least 1,000,000,000 (e.g., but not limited to, 1,000,000,000-999,999,999,999), and so on.

In some embodiments, exemplary inventive computer-based systems/platforms, exemplary inventive computer-based devices, and/or exemplary inventive computer-based components of the present disclosure may be configured to output to distinct, specifically programmed graphical user interface implementations of the present disclosure (e.g., a desktop, a web app., etc.). In various implementations of the present disclosure, a final output may be displayed on a displaying screen which may be, without limitation, a screen of a computer, a screen of a mobile device, or the like. In various implementations, the display may be a holographic display. In various implementations, the display may be a transparent surface that may receive a visual projection. Such projections may convey various forms of information, images, and/or objects. For example, such projections may be a visual overlay for a mobile augmented reality (MAR) application.

In some embodiments, exemplary inventive computer-based systems/platforms, exemplary inventive computer-based devices, and/or exemplary inventive computer-based components of the present disclosure may be configured to be utilized in various applications which may include, but not limited to, the exemplary ASR system of the present disclosure, utilizing at least one machine-learning model described herein, gaming, mobile-device games, video chats, video conferences, live video streaming, video streaming and/or augmented reality applications, mobile-device messenger applications, and others similarly suitable computer-device applications.

As used herein, the term "mobile electronic device," or the like, may refer to any portable electronic device that may or may not be enabled with location tracking functionality (e.g., MAC address, Internet Protocol (IP) address, or the like). For example, a mobile electronic device can include, but is not limited to, a mobile phone, Personal Digital Assistant (PDA), Blackberry™ Pager, Smartphone, or any other reasonable mobile electronic device.

The aforementioned examples are, of course, illustrative and not restrictive.

At least some aspects of the present disclosure will now be described with reference to the following numbered clauses.

Clause 1. A method may include: obtaining, by at least one processor, via each respective instance of at least one graphical user interface (GUI) having at least one programmable GUI element, a permission from each user in a plurality of users to monitor a plurality of activities executed within of a plurality of computing devices associated with the plurality of users; continually receiving, by the at least one processor, in response to obtaining the permission from the plurality of users, monitoring data of the plurality of activities executed within the plurality of computing devices for a first predetermined period of time; automatically verifying, by the at least one processor, at least one common session parameter associated with an interaction session database to identify a plurality of incoming interaction sessions when, based on a database of known session interaction parameters, the at least one common session parameter is associated with at least one of a particular entity, a particular individual, or a particular physical location; utilizing, by the at least one processor, a particular software application to access an interaction session database associated with at least one computing device of the plurality of computing devices; identifying, by the at least one processor, at least one interruption associated with the particular software application for a second predetermined period of time, where the at least one interruption is at least one detected anomaly within the interaction session database associated with the at least one computing device within the second predetermined period of time; utilizing, by the at least one processor, a trained anomaly verification machine learning algorithm to verify the at least one interruption based on the at least one common session parameter of the plurality of incoming interaction sessions; determining, by the at least one processor, a plurality of authentication rules associated with the at least one interruption and the at least one computing device of the plurality of the computing devices associated with the plurality of users based on a pre-generated database of authentication rules; automatically adjusting, by the at least one processor, the plurality of authentication rules associated with the at least one interruption based on a determination that the at least one interruption occurred during the second predetermined period of time; receiving, by the at least one processor, from the at least one computing device, a response to an interactive communication associated with an adjustment to the plurality of authentication rules associated with the at least one detected anomaly; and automatically updating, by the at least one processor, the database of known session interaction parameters based on the response to the interactive communication.

Clause 2. The method according to clause 1, where the monitoring data includes information associated with a plurality of interaction sessions.

Clause 3. The method according to clause 1 or 2, where the particular software application is configured to access a call log associated with the at least one computing device Clause 4. The method according to clause 1, 2 or 3, where the at least one interruption includes at least one detected anomaly within a call log associated with the at least one computing device within the second predetermined period of time.

Clause 5. The method according to clause 1, 2, 3 or 4, further including utilizing, by the at least one processor, a natural language processing algorithm to automatically generate at least one interaction communication for transmission to the at least one computing device.

Clause 6. The method according to clause 1, 2, 3, 4 or 5, further including utilizing, by the at least one processor, a graphical user interface to display at least one pre-generated interaction notification associated with the particular software application.

Clause 7. The method according to clause 1, 2, 3, 4, 5 or 6, further including dynamically retraining, by the at least one processor and in response to the adjustment of the plurality of authentication rules to increase a number of steps required to authenticate a transaction, a machine learning algorithm to automatically identify at least one subsequent interruption in response to a determination that the user is currently in a suspicious interaction session.

Clause 8. The method according to clause 1, 2, 3, 4, 5, 6 or 7, where the plurality of authentication rules includes a predetermined number of steps required to authenticate at least one transaction associated with the at least one user of the plurality of users.

Clause 9. The method according to clause 1, 2, 3, 4, 5, 6, 7 or 8, where the at least one common session parameter includes an account number associated with an identity of the at least one user of the plurality of users.

Clause 10. The method according to clause 1, 2, 3, 4, 5, 6, 7, 8 or 9, further including storing, by the at least one processor, a last received source information from the particular software application based on a first monitoring protocol message received from a source node, where the source node contains metadata associated with the first monitoring protocol message; receiving, by the at least one processor, a second monitoring protocol message from the source node, where the second monitoring protocol message comprises a received source information and metadata associated with the second monitoring protocol message; comparing, by the at least one processor, the received source information to the last received source information; determining, by the at least one processor, at least one modification associated with a source status on a communication path from the source node to a target node based on a comparison of the received source information to the last received source information; comparing, by the at least one processor and in response to determining the at least one modification associated with the source status, the metadata associated with the second monitoring protocol message to the metadata associated with the first monitoring protocol message; determining, by the at least one processor, at least one subsequent modification to the source status on the communication path from the target node to the source node; and automatically verifying, by the at least one processor, the at least one interruption based on a plurality of modifications associated with the source status.

Clause 11. A method may include: obtaining, by at least one processor, via each respective instance of at least one graphical user interface (GUI) having at least one programmable GUI element, a permission from each user in a plurality of users to monitor a plurality of activities executed within of a plurality of computing devices associated with the plurality of users; continually receiving, by the at least one processor, in response to obtaining the permission from the plurality of users, monitoring data of the plurality of activities executed within the plurality of computing devices for a first predetermined period of time; automatically verifying, by the at least one processor, at least one common session parameter associated with an interaction session database to identify a plurality of incoming interaction sessions when, based on a database of known session interaction parameters, the at least one common session parameter is associated with at least one of a particular entity, a particular individual, or a particular physical location; utilizing, by the at least one processor, a particular software application to access an interaction session database; identifying, by the at least one processor, at least one interruption associated with the particular software application for a second predetermined period of time, where the at least one interruption is at least one detected anomaly within the interaction session database associated with the computing device within the second predetermined period of time; utilizing, by the at least one processor, a trained anomaly verification machine learning algorithm to verify the at least one interruption based on the at least one common session parameter of the plurality of incoming interaction sessions; determining, by the at least one processor, a plurality of authentication rules associated with the at least one interruption and the at least one computing device of the plurality of the computing devices associated with the plurality of users based on a pre-generated database of authentication rules; automatically adjusting, by the at least one processor, the plurality of authentication rules associated with the at least one interruption based on a determination that the at least one interruption occurred during the second predetermined period of time; utilizing, by the at least one processor, a natural language processing algorithm to automatically generate at least one interaction communication for transmission to the at least one computing device; receiving, by the at least one processor, from the at least one computing device, a response to the at least one interactive communication associated with an adjustment to the plurality of authentication rules associated with the at least one detected anomaly; and automatically updating, by the at least one processor, the database of known session interaction parameters based on the response to the interactive communication.

Clause 12. The method according to clause 11, where the monitoring data includes information associated with a plurality of interaction sessions.

Clause 13. The method according to clause 11, or 12, where the particular software application is configured to access a call log associated with the at least one computing device.

Clause 14. The method according to clause 11, 12 or 13, where the at least one interruption included at least one detected anomaly within a call log associated with the at least one computing device within the second predetermined period of time.

Clause 15. The method according to clause 11, 12, 13 or 14, further including dynamically retraining, by the at least one processor and in response to the adjustment of the plurality of authentication rules to increase a number of steps required to authenticate a transaction, a machine learning algorithm to automatically identify at least one subsequent interruption in response to a determination that the user is currently in a suspicious interaction session.

Clause 16. The method according to clause 11, 12, 13, 14 or 15, where the plurality of authentication rules includes a predetermined number of steps required to authenticate at least one transaction associated with the at least one user of the plurality of users.

Clause 17. The method according to clause 11, 12, 13, 14, 15 or 16, where the at least one common session parameter includes an account number associated with an identity of the at least one user of the plurality of user.

Clause 18. The method according to clause 11, 12, 13, 14, 15, 16 or 17, further including storing, by the at least one processor, a last received source information from the particular software application based on a first monitoring protocol message received from a source node, where the source node contains metadata associated with the first monitoring protocol message; receiving, by the at least one processor, a second monitoring protocol message from the source node, where the second monitoring protocol message includes a received source information and metadata associated with the second monitoring protocol message; comparing, by the at least one processor, the received source information to the last received source information; determining, by the at least one processor, at least one modification associated with a source status on a communication path from the source node to a target node based on a comparison of the received source information to the last received source information; comparing, by the at least one processor and in response to determining the at least one modification associated with the source status, the metadata associated with the second monitoring protocol message to the metadata associated with the first monitoring protocol message; determining, by the at least one processor, at least one subsequent modification to the source status on the communication path from the target node to the source node; and automatically verifying, by the at least one processor, the at least one interruption based on a plurality of modifications associated with the source status.

Clause 19. A system may include: a non-transitory computer memory, storing software instructions; and at least one processor of at least one computing device associated with at least one user; where, when the at least one processor executes the software instructions, the at least one computing device is programmed to: obtain, by at least one processor, via each respective instance of at least one graphical user interface (GUI) having at least one programmable GUI element, a permission from each user in a plurality of users to monitor a plurality of activities executed within of a plurality of computing devices associated with the plurality of users; continually receive, by the at least one processor, in response to obtaining the permission from the plurality of users, monitoring data of the plurality of activities executed within the plurality of computing devices for a first predetermined period of time; automatically verify, by the at least one processor, at least one common session parameter associated with an interaction session database to identify a plurality of incoming interaction sessions when, based on a database of known session interaction parameters, the at least one common session parameter is associated with at least one of a particular entity, a particular individual, or a particular physical location; utilize, by the at least one processor, a particular software application to access an interaction session database associated with the at least one computing device of the plurality of computing devices;

identify, by the at least one processor, at least one interruption associated with the particular software application for a second predetermined period of time, where the at least one interruption is at least one detected anomaly within the interaction session database associated with the at least one computing device within the second predetermined period of time; utilize, by the at least one processor, a trained anomaly verification machine learning algorithm to verify the at least one interruption based on the at least one common session parameter of the plurality of incoming interaction sessions; determine, by the at least one processor, a plurality of authentication rules associated with the at least one interruption and the at least one computing device of the plurality of the computing devices associated with the plurality of users based on a pre-generated database of authentication rules; automatically adjust, by the at least one processor, the plurality of authentication rules associated with the at least one interruption based on a determination that the at least one interruption occurred during the second predetermined period of time, receive, by the at least one processor, from the at least one computing device, a response to an interactive communication associated with an adjustment to the plurality of authentication rules associated with the at least one detected anomaly; and automatically update, by the at least one processor, the database of known session interaction parameters based on the response to the interactive communication.

Clause 20. The system according to clause 19, where the software instructions further include storing, by the at least one processor, a last received source information from the particular software application based on a first monitoring protocol message received from a source node, where the source node contains metadata associated with the first monitoring protocol message; receiving, by the at least one processor, a second monitoring protocol message from the source node, where the second monitoring protocol message comprises a received source information and metadata associated with the second monitoring protocol message; comparing, by the at least one processor, the received source information to the last received source information; determining, by the at least one processor, at least one modification associated with a source status on a communication path from the source node to a target node based on a comparison of the received source information to the last received source information; comparing, by the at least one processor and in response to determining the at least one modification associated with the source status, the metadata associated with the second monitoring protocol message to the metadata associated with the first monitoring protocol message; determining, by the at least one processor, at least one subsequent modification to the source status on the communication path from the target node to the source node; and automatically verifying, by the at least one processor, the at least one interruption based on a plurality of modifications associated with the source status.

While one or more embodiments of the present disclosure have been described, it is understood that these embodiments are illustrative only, and not restrictive, and that many modifications may become apparent to those of ordinary skill in the art, including that various embodiments of the inventive methodologies, the inventive systems/platforms, and the inventive devices described herein can be utilized in any combination with each other. Further still, the various steps may be carried out in any desired order (and any desired steps may be added and/or any desired steps may be eliminated).

What is claimed is:

1. A computer-implemented method comprising:

obtaining, by at least one processor, via each respective instance of at least one graphical user interface (GUI) having at least one programmable GUI element, a permission from each user in a plurality of users to monitor a plurality of activities executed within of a plurality of computing devices associated with the plurality of users;

continually receiving, by the at least one processor, in response to obtaining the permission from the plurality of users, monitoring data of the plurality of activities executed within the plurality of computing devices for a first predetermined period of time;

automatically verifying, by the at least one processor, at least one common session parameter associated with an interaction session database to identify a plurality of incoming interaction sessions when, based on a database of known session interaction parameters, the at least one common session parameter is associated with at least one of a particular entity, a particular individual, or a particular physical location;

utilizing, by the at least one processor, a particular software application to access an interaction session database associated with at least one computing device of the plurality of computing devices;

identifying, by the at least one processor, at least one interruption associated with the particular software application for a second predetermined period of time, wherein the at least one interruption is at least one detected anomaly within the interaction session database associated with the at least one computing device within the second predetermined period of time;

utilizing, by the at least one processor, a trained anomaly verification machine learning algorithm to verify the at least one interruption based on the at least one common session parameter of the plurality of incoming interaction sessions;

determining, by the at least one processor, a plurality of authentication rules associated with the at least one interruption and the at least one computing device of the plurality of computing devices associated with the plurality of users based on a pre-generated database of authentication rules;

automatically adjusting, by the at least one processor, the plurality of authentication rules associated with the at least one interruption based on a determination that the at least one interruption occurred during the second predetermined period of time;

receiving, by the at least one processor, from the at least one computing device, a response to an interactive communication associated with an adjustment to the plurality of authentication rules associated with the at least one detected anomaly; and automatically updating, by the at least one processor, the database of known session interaction parameters based on the response to the interactive communication.

2. The method of claim 1, wherein the monitoring data comprises information associated with a plurality of interaction sessions.

3. The method of claim 1, wherein the particular software application is configured to access a call log associated with the at least one computing device.

4. The method of claim 1, wherein the at least one interruption comprises at least one detected anomaly within a call log associated with the at least one computing device within the second predetermined period of time.

5. The method of claim 1, further comprising:
utilizing, by the at least one processor, a natural language processing algorithm to automatically generate at least one interaction communication for transmission to the at least one computing device.

6. The method of claim 1, further comprising:
utilizing, by the at least one processor, a graphical user interface to display at least one pre-generated interaction notification associated with the particular software application.

7. The method of claim 1, further comprising:
dynamically retraining, by the at least one processor and in response to the adjustment of the plurality of authentication rules to increase a number of steps required to authenticate a transaction, a machine learning algorithm to automatically identify at least one subsequent interruption in response to a determination that the user is currently in a suspicious interaction session.

8. The method of claim 1, wherein the plurality of authentication rules comprise a predetermined number of steps required to authenticate at least one transaction associated with the at least one user of the plurality of users.

9. The method of claim 1, wherein the at least one common session parameter comprises an account number associated with an identity of the at least one user of the plurality of users.

10. The method of claim 1, further comprising:
storing, by the at least one processor, a last received source information from the particular software application based on a first monitoring protocol message received from a source node,
wherein the source node contains metadata associated with the first monitoring protocol message;
receiving, by the at least one processor, a second monitoring protocol message from the source node,
wherein the second monitoring protocol message comprises a received source information and metadata associated with the second monitoring protocol message;
comparing, by the at least one processor, the received source information to the last received source information;
determining, by the at least one processor, at least one modification associated with a source status on a communication path from the source node to a target node based on a comparison of the received source information to the last received source information;
comparing, by the at least one processor and in response to determining the at least one modification associated with the source status, the metadata associated with the second monitoring protocol message to the metadata associated with the first monitoring protocol message;
determining, by the at least one processor, at least one subsequent modification to the source status on the communication path from the target node to the source node; and
automatically verifying, by the at least one processor, the at least one interruption based on a plurality of modifications associated with the source status.

11. A computer-implemented method comprising:
obtaining, by at least one processor, via each respective instance of at least one graphical user interface (GUI) having at least one programmable GUI element, a permission from each user in a plurality of users to monitor a plurality of activities executed within of a plurality of computing devices associated with the plurality of users;
continually receiving, by the at least one processor, in response to obtaining the permission from the plurality of users, monitoring data of the plurality of activities executed within the plurality of computing devices for a first predetermined period of time;
automatically verifying, by the at least one processor, at least one common session parameter associated with an interaction session database to identify a plurality of incoming interaction sessions when, based on a database of known session interaction parameters, the at least one common session parameter is associated with at least one of a particular entity, a particular individual, or a particular physical location;
utilizing, by the at least one processor, a particular software application to access an interaction session database;
identifying, by the at least one processor, at least one interruption associated with the particular software application for a second predetermined period of time, wherein the at least one interruption is at least one detected anomaly within the interaction session database associated with the at least one computing device within the second predetermined period of time;
utilizing, by the at least one processor, a trained anomaly verification machine learning algorithm to verify the at least one interruption based on the at least one common session parameter of the plurality of incoming interaction sessions;
determining, by the at least one processor, a plurality of authentication rules associated with the at least one interruption and the at least one computing device of the plurality of computing devices associated with the plurality of users based on a pre-generated database of authentication rules;
automatically adjusting, by the at least one processor, the plurality of authentication rules associated with the at least one interruption based on a determination that the at least one interruption occurred during the second predetermined period of time;
utilizing, by the at least one processor, a natural language processing algorithm to automatically generate at least one interaction communication for transmission to the at least one computing device;
receiving, by the at least one processor, from the at least one computing device, a response to the at least one interactive communication associated with an adjustment to the plurality of authentication rules associated with the at least one detected anomaly; and
automatically updating, by the at least one processor, the database of known session interaction parameters based on the response to the at least one interactive communication.

12. The method of claim 11, wherein the monitoring data comprises information associated with a plurality of interaction sessions.

13. The method of claim 11, wherein the particular software application is configured to access a call log associated with the at least one computing device.

14. The method of claim 11, wherein the at least one interruption comprises at least one detected anomaly within a call log associated with the at least one computing device within the second predetermined period of time.

15. The method of claim 11, further comprising:
dynamically retraining, by the at least one processor and in response to the adjustment of the plurality of authentication rules to increase a number of steps required to authenticate a transaction, a machine learning algorithm to automatically identify at least one subsequent interruption in response to a determination that the user is currently in a suspicious interaction session.

16. The method of claim 11, wherein the plurality of authentication rules comprise a predetermined number of steps required to authenticate at least one transaction associated with the at least one user of the plurality of users.

17. The method of claim 11, wherein the at least one common session parameter comprises an account number associated with an identity of the at least one user of the plurality of user.

18. The method of claim 11, further comprising:
storing, by the at least one processor, a last received source information from the particular software application based on a first monitoring protocol message received from a source node,
wherein the source node contains metadata associated with the first monitoring protocol message;
receiving, by the at least one processor, a second monitoring protocol message from the source node,
wherein the second monitoring protocol message comprises a received source information and metadata associated with the second monitoring protocol message;
comparing, by the at least one processor, the received source information to the last received source information;
determining, by the at least one processor, at least one modification associated with a source status on a communication path from the source node to a target node based on a comparison of the received source information to the last received source information;
comparing, by the at least one processor and in response to determining the at least one modification associated with the source status, the metadata associated with the second monitoring protocol message to the metadata associated with the first monitoring protocol message;
determining, by the at least one processor, at least one subsequent modification to the source status on the communication path from the target node to the source node; and
automatically verifying, by the at least one processor, the at least one interruption based on a plurality of modifications associated with the source status.

19. A system comprising:
a non-transitory computer memory, storing software instructions; and
at least one processor of at least one computing device associated with at least one user;
wherein, when the at least one processor executes the software instructions, the at least one computing device is programmed to:
obtain, by at least one processor, via each respective instance of at least one graphical user interface (GUI) having at least one programmable GUI element, a permission from each user in a plurality of users to monitor a plurality of activities executed within of a plurality of computing devices associated with the plurality of users;
continually receive, by the at least one processor, in response to obtaining the permission from the plurality of users, monitoring data of the plurality of activities executed within the plurality of computing devices for a first predetermined period of time;
automatically verify, by the at least one processor, at least one common session parameter associated with an interaction session database to identify a plurality of incoming interaction sessions when, based on a database of known session interaction parameters, the at least one common session parameter is associated with at least one of a particular entity, a particular individual, or a particular physical location;
utilize, by the at least one processor, a particular software application to access an interaction session database associated with the at least one computing device of the plurality of computing devices;
identify, by the at least one processor, at least one interruption associated with the particular software application for a second predetermined period of time,
wherein the at least one interruption is at least one detected anomaly within the interaction session database associated with the at least one computing device within the second predetermined period of time;
utilize, by the at least one processor, a trained anomaly verification machine learning algorithm to verify the at least one interruption based on the at least one common session parameter of the plurality of incoming interaction sessions;
determine, by the at least one processor, a plurality of authentication rules associated with the at least one interruption and the at least one computing device of the plurality of the computing devices associated with the plurality of users based on a pre-generated database of authentication rules;
automatically adjust, by the at least one processor, the plurality of authentication rules associated with the at least one interruption based on a determination that the at least one interruption occurred during the second predetermined period of time,
receive, by the at least one processor, from the at least one computing device, a response to an interactive communication associated with an adjustment to the plurality of authentication rules associated with the at least one detected anomaly; and
automatically update, by the at least one processor, the database of known session interaction parameters based on the response to the interactive communication.

20. The system of claim 19, wherein the software instructions further comprise:
storing, by the at least one processor, a last received source information from the particular software application based on a first monitoring protocol message received from a source node,
wherein the source node contains metadata associated with the first monitoring protocol message;
receiving, by the at least one processor, a second monitoring protocol message from the source node,
wherein the second monitoring protocol message comprises a received source information and metadata associated with the second monitoring protocol message;

comparing, by the at least one processor, the received source information to the last received source information;

determining, by the at least one processor, at least one modification associated with a source status on a communication path from the source node to a target node based on a comparison of the received source information to the last received source information;

comparing, by the at least one processor and in response to determining the at least one modification associated with the source status, the metadata associated with the second monitoring protocol message to the metadata associated with the first monitoring protocol message;

determining, by the at least one processor, at least one subsequent modification to the source status on the communication path from the target node to the source node; and automatically verifying, by the at least one processor, the at least one interruption based on a plurality of modifications associated with the source status.

* * * * *